(12) United States Patent
Bohnsack et al.

(10) Patent No.: US 9,980,535 B2
(45) Date of Patent: May 29, 2018

(54) METHOD OF MANUFACTURING SPRAY-ON FOOTWEAR

(71) Applicant: Wolverine Outdoors, Inc., Rockford, MI (US)

(72) Inventors: Shaun Michael Bohnsack, Grand Rapids, MI (US); Clark A. Matis, Durango, CO (US); Lee Martin Smith, London (GB); John H. Burch, Belmont, MI (US); Martin William Frederick Dean, Hemel Hempstead (GB); Christopher John Loveder, Rockford, MI (US)

(73) Assignee: Wolverine Outdoors, Inc., Rockford, MI (US)

( * ) Notice: Subject to any disclaimer, the term of this patent is extended or adjusted under 35 U.S.C. 154(b) by 0 days. days.

(21) Appl. No.: 15/434,193

(22) Filed: Feb. 16, 2017

(65) Prior Publication Data
US 2017/0238659 A1    Aug. 24, 2017

Related U.S. Application Data

(60) Provisional application No. 62/297,178, filed on Feb. 19, 2016.

(51) Int. Cl.
*A43D 999/00* (2006.01)
*A43B 23/02* (2006.01)
(Continued)

(52) U.S. Cl.
CPC ............ *A43B 23/0245* (2013.01); *A43B 9/08* (2013.01); *A43B 13/32* (2013.01); *A43B 23/0215* (2013.01); *A43B 23/042* (2013.01);
*A43D 1/025* (2013.01); *A43D 3/026* (2013.01); *A43D 3/10* (2013.01); *B29C 33/3842* (2013.01); *B29C 41/08* (2013.01); *B29C 67/0059* (2013.01);
(Continued)

(58) Field of Classification Search
CPC . A43D 3/026; A43D 3/10; A43D 8/22; A43D 2200/00; A43D 2200/10; A43B 9/08
See application file for complete search history.

(56) References Cited

U.S. PATENT DOCUMENTS 1,972,976 A    9/1934  Burnham et al.
8,291,617 B2  10/2012  Halberstadt et al.
(Continued)

OTHER PUBLICATIONS https://www.wired.com/2010/09/spray-on-fabric, per 9 pages filed Feb. 16, 2017.

*Primary Examiner* — Ted Kavanaugh
(74) *Attorney, Agent, or Firm* — Warner Norcross + Judd LLP

(57) ABSTRACT

A method is provided for making footwear utilizing a spray-on material. The method can include spraying a spray-on fabric onto surfaces of a three dimensional last. The last can be produced using additive manufacturing techniques, such as 3D printing, based on data corresponding to dimensions and contours of a consumer's foot, and/or preselected aesthetic footwear designs. The spray-on fabric is sprayed onto the surfaces of the last and allowed to cure to form a flexible, non-woven fabric upper. The upper can be removed from the last and turned inside out. With the upper turned inside out, a sole can be joined to the fabric upper to form the footwear.

20 Claims, 5 Drawing Sheets

(51) Int. Cl.

| | | |
|---|---|---|
| *A43D 3/02* | (2006.01) | |
| *A43B 13/32* | (2006.01) | |
| *A43B 9/08* | (2006.01) | |
| *A43B 23/04* | (2006.01) | |
| *A43D 1/02* | (2006.01) | |
| *G06Q 30/06* | (2012.01) | |
| *G05B 19/4099* | (2006.01) | |
| *B29C 67/00* | (2017.01) | |
| *B29C 33/38* | (2006.01) | |
| *B33Y 10/00* | (2015.01) | |
| *B33Y 80/00* | (2015.01) | |
| *B29D 35/12* | (2010.01) | |
| *B29D 35/06* | (2010.01) | |
| *B29C 41/08* | (2006.01) | |
| *A43D 3/10* | (2006.01) | |

(52) U.S. Cl.
CPC ........... *B29D 35/06* (2013.01); *B29D 35/128* (2013.01); *B33Y 10/00* (2014.12); *B33Y 80/00* (2014.12); *G05B 19/4099* (2013.01); *G06Q 30/0621* (2013.01); *A43D 2200/10* (2013.01); *G05B 2219/49023* (2013.01)

(56) References Cited

U.S. PATENT DOCUMENTS

| | | |
|---|---|---|
| 9,005,710 B2 | 4/2015 | Jones et al. |
| 2015/0007451 A1* | 1/2015 | Bruce ................ A43B 23/0215 36/83 |
| 2016/0166010 A1* | 6/2016 | Bruce ..................... A43D 3/02 12/133 R |
| 2016/0166011 A1* | 6/2016 | Bruce ..................... A43D 3/02 12/51 |
| 2017/0202309 A1* | 7/2017 | Sterman ................ B33Y 10/00 |

\* cited by examiner

METHOD OF MANUFACTURING SPRAY-ON FOOTWEAR

BACKGROUND OF THE INVENTION

The present invention relates to footwear, and more particularly to a method of making footwear utilizing 3D last printing and spray-on fabric technology.

Footwear manufacturing techniques have evolved through time, however, most are still impaired by associated labor costs and overhead. For example, most conventional footwear are constructed from a variety of components that are precisely fit and overlapped relative to one another, then stitched together by a worker to form the upper of the footwear. The stitching process is very labor intensive and time-consuming. While many footwear manufacturers have outsourced their manufacturing process overseas, to countries having significant labor forces, the minimum wage and social tax in those countries has greatly increased the cost of labor in recent years. In turn, this has increased the cost to manufacture footwear.

Many footwear utilize assemblies of components constructed from animal hides. In recent years, the animal hide market has experienced significant volatility, which has led to uncertainty in raw material costs, and resultant, notable fluctuations in footwear costs.

In addition, most conventional footwear is constructed to fit the "average" footwear sizes. Generally, footwear manufacturers produce a variety of different sizes and widths of certain footwear models, with the hope of coming close to fitting the feet of most potential purchasers. Many such footwear, however, are constructed with multiple overlays or panels that are stitched to one another, as mentioned above. These overlays, and the resultant footwear, are frequently difficult to match to the shapes of a large variety of compound curves or contours of certain feet, let alone many differently shaped feet. Thus, consumers are left to choose between footwear that may come close to their foot size and shape, but that ultimately do not provide a good or ideal fit to promote comfort, stability and protection.

In addition, most footwear is manufactured based on aesthetic models developed by the footwear manufacturer. These models may or may not be appealing to some consumers. Thus, those consumers are left to select a style of footwear that comes close to their aesthetic or fashion concerns—or to simply live with footwear designs that are unappealing to them.

Accordingly, there remains room for improvement in the area of footwear manufacturing to reduce labor costs and material costs, and to provide a degree of customization for the footwear consumer.

SUMMARY OF THE INVENTION

A method is provided for making footwear utilizing a spray-on material. In one embodiment, the method can include spraying a spray-on fabric onto surfaces of a three dimensional last. The spray-on fabric sprayed on the surfaces of the last is allowed to cure to form a flexible, non-woven fabric upper. The upper can be removed from the last and optionally turned inside out. Further optionally, with the upper turned inside out, a sole can be joined to the fabric upper to form the footwear.

In a further embodiment, the three dimensional last can be produced using additive manufacturing techniques, such as 3D printing, based on data corresponding to dimensions and contours of a consumer's foot, aesthetic footwear designs and/or other criteria.

In another embodiment, an interface can be provided so that a consumer or manufacturer can input three dimensional last data, which can include the dimensions and contours of a consumer's foot, aesthetic footwear designs and/or other criteria. This data can be utilized by a 3D printer to print the three dimensional last. Optionally, the aesthetic footwear design can include a variety of design elements that the consumer or manufacturer desires to be visible on the exterior of the finished footwear. The dimensions can include conventional footwear sizes including length and width. The contours of the consumer's foot can be generated by a three dimensional scanner and/or underfoot pressure sensor mat. The aesthetic designs can be generated by the consumer or manufacturer directly, and can include aesthetic designs of the entire footwear or aesthetic designs to be included in preselected portions or regions of the footwear. These designs can be two or three dimensional, and can project from exterior surfaces of a three dimensional last.

In still another embodiment, the three dimensional last is produced to include multiple exterior footwear surfaces having the aesthetic footwear designs expressed in a three dimensional form. During the spraying step, the spray-on fabric covers the three dimensional form so that it is reflected on the interior surface of the sprayed on material that contacts or is adjacent the exterior surfaces.

In even another embodiment, the spray-on fabric is allowed to cure to form a flexible, non-woven fabric upper. The upper includes a first upper interior surface and a first upper exterior surface. The first upper interior surface is adjacent the three dimensional last. After the fabric cures, for example by a solvent evaporating from the spray-on fabric or some other curing process, the upper is removed from the three dimensional last. The fabric upper is turned inside out so that the first upper exterior becomes a second upper interior surface, and the first upper interior becomes a second upper exterior surface.

In yet another embodiment, when the upper is turned inside out, the aesthetic design on the first upper interior surface, generated by the aesthetic design on the exterior surfaces of the three dimensional last, are produced as mirror images of the aesthetic design of the exterior surfaces of the three dimensional last.

In a further embodiment, the three dimensional last can include multiple projections and/or recesses that produce the aesthetic design. These projections and recesses are reflected in the first upper interior to form corresponding recess and projections, which when the upper is turned inside out, show as the components of the aesthetic design in the final footwear.

In still a further embodiment, the spray-on fabric can be sprayed onto the exterior footwear surfaces of the last with an automated machine and/or a nozzle guided manually by a human.

In still yet a further embodiment, the method includes providing a consumer interface so that the consumer can input an aesthetic footwear design to a controller. The three dimensional printer can be controlled with the controller utilizing the aesthetic footwear design to print the three dimensional last with the three dimensional printer before the spraying step.

The current embodiments of the method for making footwear and related method footwear that provide benefits that previously have been unachievable. For example, where a spray-on fabric is used to construct an upper, that upper has few components, is low cost and requires minimal manual labor to manufacture. In turn, this can reduce labor and material costs to manufacture the footwear. It also can reduce dependence on the volatile animal hide market. Where a three dimensional last is constructed by a user to mimic the user's foot contours and dimensions, the footwear can be extremely well fitted, providing a custom size footwear. Where the user is empowered to select and/or produce their own aesthetic footwear designs, this can provide an enhanced purchasing experience concerning the footwear.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

Figure 1:
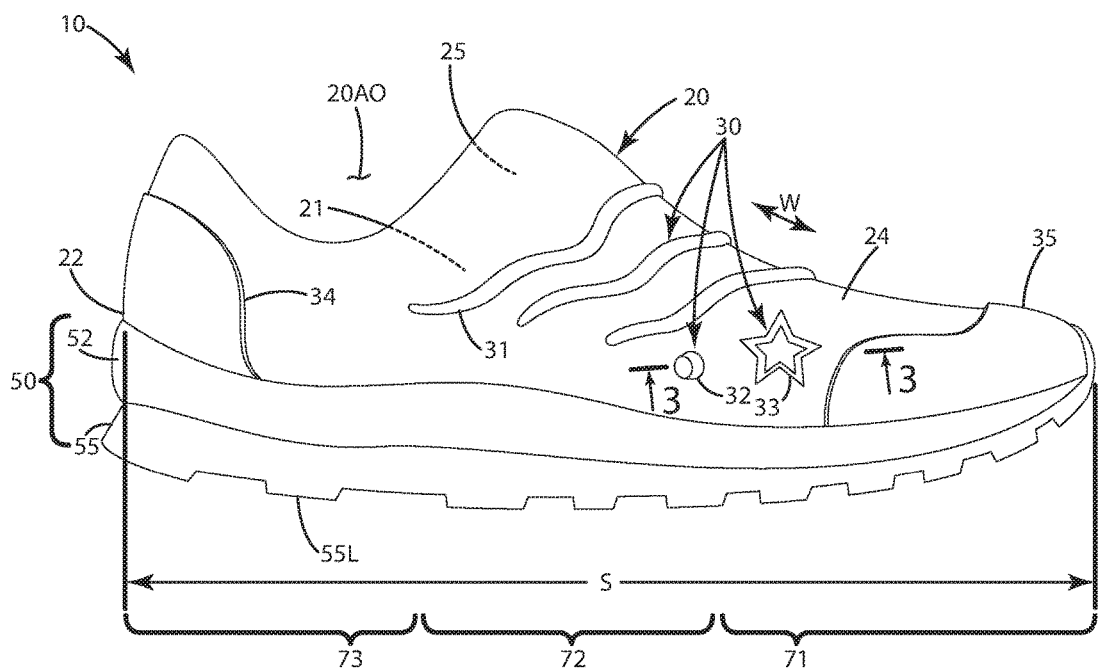
FIG. 1 is a side view of footwear manufactured according to a current embodiment.
Figure 2:
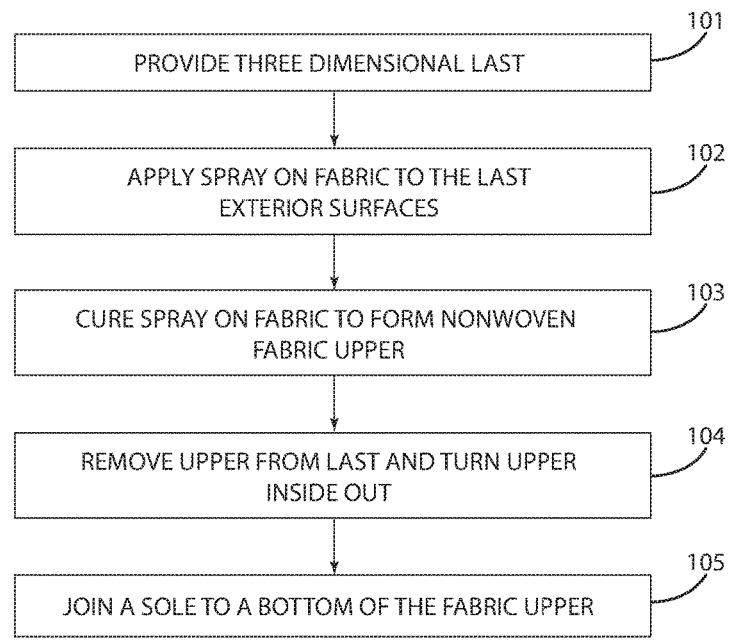
FIG. 2 is a schematic of a method for manufacturing footwear of the current embodiment.

A current embodiment of the footwear is illustrated in FIG. 1, and generally designated 10, with the related method of manufacture illustrated in FIG. 2, and designated 100. The finished footwear 10 includes a flexible, non-woven upper 20, formed via a spray-on fabric process as described below, joined with a sole assembly 50 having a midsole 52 and outsole 55. The non-woven fabric upper 20 includes a foot-receiving upper interior 21 that can be closed at the bottom or lowermost portion 22 due to the spray-on process forming a closed bottom of the upper. The footwear 10 can include a footbed and/or insole (not shown) disposed in the interior 21 of the upper 10.

Referring to FIG. 2, the method 100 of the current embodiments generally includes steps of providing a three dimensional last 101, where the last is optionally constructed using last data via additive manufacturing process; applying a spray-on fabric or material to exterior surfaces of the three dimensional last 102; curing the spray-on fabric to form a non-woven flexible fabric upper 103; removing the fabric upper from the three dimensional last and turning the fabric upper inside out 104; and joining a sole to a bottom portion of the fabric upper when it is turned inside out 105. The above footwear 10 and method 100 will be described in further detail below.

As used herein, an additive manufacturing process can include 3D printing one or more materials from a source of the material to a receiving surface or object. Optionally the printing can occur in various levels, depositing one level of material after another until the object is completed. A variety of materials can be used in an additive process, for example, polymers, metals, composites, mixtures thereof, and other materials.

As used herein, three-dimensional printer, three-dimensional printing system, 3D printer and the like refer to any 3D printing system or 3D printer. Further, as used herein three-dimensional printing, 3D printing, and printing refer to the printing of a particular item using a 3D printer, according to the new methods herein.

As used herein, the term spray-on fabric refers generally to a fabric or material that emanates from a source and is effectively sprayed on an item. Spray-on fabric can be constructed to include multiple fibers that are combined with a polymer and a solvent. The types of fibers used in the material can be natural, synthetic, including keratin fibers, such as wool and mohair, cotton, nylon, cellulose, carbon nanofibers, combinations of the foregoing and others. In some cases, scents and other sensory elements can be included in the spray-on fabric. The solvent can be adapted to enable the spray-on fabric to be dispensed from the source and/or nozzle in at least one of a liquid form and a semi liquid form. By liquid form, it is meant that the spray-on fabric is primarily in liquid form, and by semi-liquid form, it is meant that at least part of the dispensed spray-on fabric is liquid and another part is either solid and/or gaseous form. Optionally, the solvent is selected to evaporate or dissipate or cure upon exposure to the ambient environment or some other selected environment, gas, light wavelength (e.g., UV), etc. so that the fibers and polymer remain, forming a nonwoven, fabric structure. Further optionally, the spray-on fabric in some cases can be in the form of a thermoplastic polymer, silicone, rubber, coating or other material capable of being sprayed onto a last.

Even further optionally, the spray-on fabric can be a composition comprising fibers, a binder, a first carrier in which the binder is dissolved, and a second carrier, where the boiling point of the second carrier is at least 40° C. is higher than the boiling point of the first carrier, as described in U.S. Published application 2010/02865832 Torres, which is hereby incorporated by reference in its entirety.

One suitable material is known under the trade name FABRICAN, which is commercially available from Fabrican, Ltd. of London, England. The material can be formed from a liquid suspension which is then sprayed by via an automated machine, a spray gun and/or an aerosol can. A fabric can be formed by the cross-linking of fibers which adhere to create an instant non-woven fabric that can be sprayed on to any surface. Optionally, intricate patterns can be created in a variety of colors to provide an aesthetically pleasing fabric.

For purposes of disclosure, the embodiments herein are described in connection with footwear in the form of a performance shoe 10 having an upper 20 constructed from a flexible, non-woven spray-on fabric. The embodiments herein, however, may be incorporated into any type or style of footwear, including athletic shoes, running shoes, trail shoes and boots, all-terrain shoes, barefoot running shoes, sneakers, conventional tennis shoes, walking shoes, multi-sport footwear, casual shoes, loafers, dress shoes or any other type of footwear or footwear components. It also should be noted that directional terms, such as "vertical," "horizontal," "top," "bottom," "upper," "lower," "inner," "inwardly," "outer" and "outwardly," are used to assist in describing the invention based on the orientation of the embodiments shown in the illustrations. Further, the terms "medial," "lateral" and "longitudinal" are used in the manner commonly used in connection with footwear. For example, when used in referring to a side of the shoe, the term "medial" refers to the inward side (that is, the side facing the other shoe) and "lateral" refers to the outward side. When used in referring to a direction, the term "longitudinal direction" refers to a direction generally extending along the length of the shoe between toe and heel, and the term "lateral direction" refers to a direction generally extending across the width of the shoe between the medial and lateral sides of the shoe. The use of directional terms should not be interpreted to limit the invention to any specific orientation.

Further, as used herein, the term "arch region" (or arch or midfoot) refers generally to the portion of the footwear or sole assembly corresponding to the arch or midfoot of the wearer's foot; the term "forefoot region" (or forefoot) refers generally to the portion of the footwear forward of the arch region corresponding to the forefoot (for example, including the ball and the toes) of a wearer's foot; and the term "heel region" (or heel) refers generally to that portion of the footwear rearward of the arch region corresponding to the heel of the wearer's foot. The forefoot 71, arch or midfoot 72 and heel 73 regions are generally identified in FIG. 1, however, it is to be understood that delineation of these regions may vary depending upon the configuration of the sole assembly and footwear.

With reference to FIG. 1, the footwear 10 produced according to the current embodiments and methods can include a non-woven spray-on upper 20 joined with a sole assembly 50. The spray-on upper 20 can include an interior foot receiving cavity 21 and ankle opening 20A0, and corresponding parts in the forefoot region 71, the arch region 72 and/or the heel region 73. The spray-on upper 20 also can include a second exterior surface 24 and a second interior surface 25. The second exterior surface 24 generally forms and outer exterior and visible surface of the upper, while the second interior surface 25 generally forms the boundaries of the interior foot receiving cavity 21. The second exterior surface 24 can extend from toe to heel and can be sized a length, size or dimension S that conforms to a sample actual foot length dimension (e.g., actual length) or a sample foot having last standard size (e.g., 7, 8, 9, 10, etc.). The second exterior surface also can span a width W that conforms to a sample actual foot with dimension (e.g., actual width) or a sample foot having a last standard width (e.g., D, E, EE, EEE, etc.).

FIG. 1 also illustrates one or more aesthetic footwear designs 30 that are visible to a viewer of the exterior of the upper 20, and which are generally disposed on the second upper exterior 24. These aesthetic footwear designs can include a first aesthetic design 31, which can correspond to projections such as ridges extending over the top of the foot and down the lateral and medial sides of the foot if desired, a second aesthetic design 32 which can correspond to a cylindrical or other shaped projection, and/or a third aesthetic design 33 corresponds to an ornamental shape that is recessed relative to the second exterior surface 24. The aesthetic footwear designs 30 also can include semi-functional aesthetic designs 34, for example in the form of a faux heel counter, and/or anesthetic design in the form of a toe bumper 35. A variety of other aesthetic footwear designs can be incorporated into the fabric upper 20.

Figure 3:
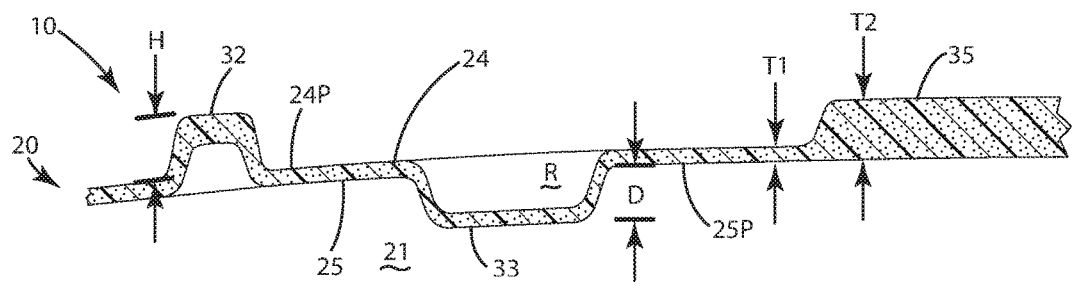
FIG. 3 is a section view of the upper taken along lines 3-3 of FIG. 1.

Generally, the aesthetic footwear designs are visible to a viewer of the footwear. The visibility can be provided and/or enhanced by ensuring that the designs extend above or below the second exterior surface 24 of the upper 20, forming respective projections or recesses within that second exterior surface 24. With reference to FIG. 3, projections and recesses included in the upper 20 are illustrated. For example the first aesthetic design 32 is a projection extending outwardly from the primary second exterior surface 24P of the second exterior surface 24. This projection projects upwardly a height H from that primary second exterior surface 24P, but the height can vary depending on the application. For example, the height can be optionally 1 mm to 10 mm, further optionally 2 mm to 5 mm, even further optionally 2 mm to 6 mm, or other heights depending on the application and desired visibility and/or function of the aesthetic design feature. The third aesthetic design 33 can be in the form of a star shaped recess R that extends inwardly from the primary second exterior surface 24P. This recess R also can be considered to extend inward from a primary second interior surface 25P for a distance D. This distance D can vary depending on the application. For example, the distance can be optionally 1 mm to 10 mm, further optionally 2 mm to 5 mm, even further optionally 2 mm to 6 mm, or other depths depending on the application and desired visibility and/or function of the aesthetic design feature. Further, the depth D can be selected so as not to provide added pressure points on the wearer's foot when the footwear is installed on the foot. In some cases, if the depth D is too great, it might create blisters on or provide discomfort to the wearer.

As noted above, the aesthetic footwear designs can also include semi-functional and/or functional components, such as a faux heel counter 34 and/or a toe bumper 35. In some cases, these aesthetic footwear designs can have a greater thickness of the spray-on fabric in the upper 20 to enhance structural rigidity and/or provide additional wear resistance to areas of high abrasion. For example, as shown in FIG. 3, the toe bumper 35 can be of a thickness T2 that is greater than the thickness T1 of the remainder of the upper. This thickness T2 can provide extra rigidity around the toe bumper and also can provide extra abrasion resistance in this region. Although not shown, the heel counter can likewise be of a greater thickness. The thickness T2 can be at least 1 mm, 2 mm, 3 mm, 4 mm, 5 mm or 10 mm greater than thickness T1. Further, the thicknesses can be in different areas of the footwear than as shown. Generally, where the upper transitions from a designed such as a toe bumper 35 to an adjacent portion of the upper having a decreased thickness, the spray-on fabric in those regions can be homogeneous in content and material, but can be integral with one another at the transition. These elements might not be separately constructed aesthetic designs that are simply joined with the upper.

Although the aesthetic footwear designs 30 above are shown in conjunction with particularly shaped recesses, projections and/or enhanced thicknesses of the upper, these aesthetic footwear designs can be modified or adjusted to virtually any shape that is three dimensionally reflected and/or exposed on the upper 20. Further, the footwear aesthetic designs can be placed anywhere on the exterior the footwear to provide a desired visual effect and/or functional effect. In some cases, the aesthetic footwear designs can be specifically designed to engage certain parts of the wearer's foot and/or provide localized pressure points when the wearer's foot is placed in the interior cavity 21 of the footwear 10. This might be accomplished by having deeper recesses R with enhanced depths D.

In other cases, the thickness of the upper can be increased to selectively provide localized pressure points on the interior of the footwear. It is also to be understood that in some cases, the spray-on upper may include no aesthetic footwear designs, with the upper 20 simply following some preselected surface contours of a sample foot/last or an actual wearer's foot. Further, as discussed below, the respective aesthetic footwear designs can be designed selected or otherwise input by a consumer or the manufacturer. Likewise, the dimensions and surface contours desired in the upper can also be input by the consumer and/or manufacturer as discussed in connection with the method below.

With reference to FIG. 1, the footwear 10 also can include a sole assembly 50 that is of a two-piece construction, optionally including the midsole 52 and outsole 55. The midsole 52 can be constructed from a material having a first density that is generally less dense than the density of the material from which the outsole 55 is constructed. The first density of the midsole 52 can be such that it compresses relatively easily to provide cushion to the wearer's foot. The midsole can be constructed from ethyl vinyl acetate (EVA), polyurethane, latex, foam, a gel or other materials.

The outsole 55 can be adhered, cemented and/or molded directly to the underside of the midsole 52 to form the sole assembly 50. The outsole 55 can be constructed from one or more materials, such as rubber, and can include lugs, tread, or other gripping elements on the lower surface 55L thereof. Alternatively, the outsole 55 can be constructed from a thermoplastic polyurethane elastomer (TPU), nylon or other polymer blend that includes nylon and/or TPU. Of course, the outsole 55 can be constructed from any relatively wear resistant polymer, elastomer and/or natural or synthetic rubber or other materials capable of providing the desired functional characteristics. The outsole can be constructed to include thermoplastic elastomers and/or thermoset elastomers. Other materials, such as fiber-reinforced polymers, can be used. These can include epoxy, polyethylene, polyester, thermosetting plastic reinforced with carbon, glass and/or aramid fibers.

Figure 4:
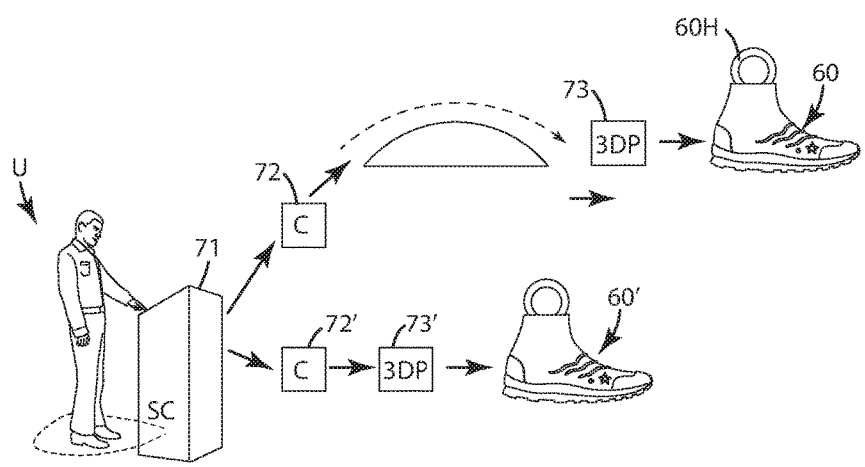
FIG. 4 is a schematic view of three dimensional last data being used by a 3D printer to create a last.

A method for manufacturing the footwear according to a current embodiment will now be described with reference to FIGS. 2-8. As shown in FIG. 2, the method can include a step 101 of providing a three dimensional last 60. This three dimensional last can be produced from molded metals or polymers using molding techniques. Optionally, as shown in FIG. 4, the three dimensional last can be produced using three-dimensional data with an additive process machine, such as a 3D printer 73 shown in FIG. 4.

To begin a step of providing a three dimensional last 60, a user U can input selections or other information into an interface 71. The user can be a consumer or an employee of a manufacturer. The interface 71 can be in the form of a kiosk, a smart device, a smart phone, a touchscreen or other GUI, that can communicate data to a controller 72. The interface can be in a retail footwear store if desired, or in the user's place of work or home. Optionally, the interface can be a website with which the user U interacts to transmit information over the Internet to other devices such as a controller 72, at some remote location.

As mentioned, the user U can input data into the interface 71. This data can be in the form of three dimensional last data that corresponds to a particular aesthetic footwear design, whether generated by a consumer or a manufacturer, a dimension of a sample foot, surface contours of the sample foot, and the like. As an example, the aesthetic footwear design can be aesthetic footwear designs like those illustrated in FIG. 1. Of course, where a consumer or manufacturer desires different designs, those can be created via the interface.

The three dimensional last data input by the user can include a length, size or dimension S that conforms to a sample actual foot length dimension (e.g., actual length) or a sample foot having last standard size (e.g., 7, 8, 9, 10, etc.). The data can include a width W that conforms to a sample actual foot with dimension (e.g., actual width) or a sample foot having a last standard width (e.g., D, E, EE, EEE, etc.). Optionally, data associated with the dimensions of the both of the consumer's feet, that is the left and right feet, can individually or collectively be entered via the interface. In this manner, the respective left and right shoes produced via the method of the current embodiment can be customized to each of the left and right feet.

Three dimensional data also can include information concerning surface contours of sample feet, for example the actual surface contours of the consumer's feet. These surface contours can be obtained via a three-dimensional scanner SC (FIG. 4) that is associated with the interface 71. Of course scanner can be completely separate in a different location from the interface. The scanner can three dimensionally scan the one or more of the user's feet to capture dimensions and the various undulations and surface contours of the feet, including natural and abnormal contours unique to the consumer.

The three dimensional last data can be transferred from the interface 71 to a controller 72 as shown in FIG. 4. The controller can be a computer, processor or computing device. The controller 72 can be in communication with an additive process machine, such as a 3D printer 73. The 3D printer 73' can be located near the controller (for example, in the same facility) and in direct communication with the controller 72', as shown in the lower portion of FIG. 4. The direct communication can be via a hardwire, Wi-Fi and/or Bluetooth or some other means. As shown in the upper portion of FIG. 4, the 3D printer 73 can be located distal from the controller 72, for example, in an overseas manufacturing facility, or some other facility remote from the controller and/or interface. In this case, the controller can transmit via the Internet or other communication channels the three dimensional data to the 3D printer 73.

After the three dimensional printer receives the three dimensional footwear data, it processes/translates that data into directives for the components of the 3D printer to print the last 60, and optionally to print lasts corresponding to left and right footwear for a consumer. The 3D printer can print multiple successive levels of materials as noted above, one on top of the other, until the last is created. Optionally, the printed last 60 can be outfitted with a handle 60H, which can be used by the manufacturer to pick up and move the three dimensional last 60 after it is fully formed. The handle 60H in some cases can be held by a user to support the three dimensional last during the spray-on step below to facilitate application of the spray-on fabric. The handle 60H also can be configured so that it and/or the last can be fixedly attached to a fixture, for example the fixture 60F in FIG. 5 to hold the last in a fixed configuration during a spray-on fabric application as described further below.

Figures 5, 6:
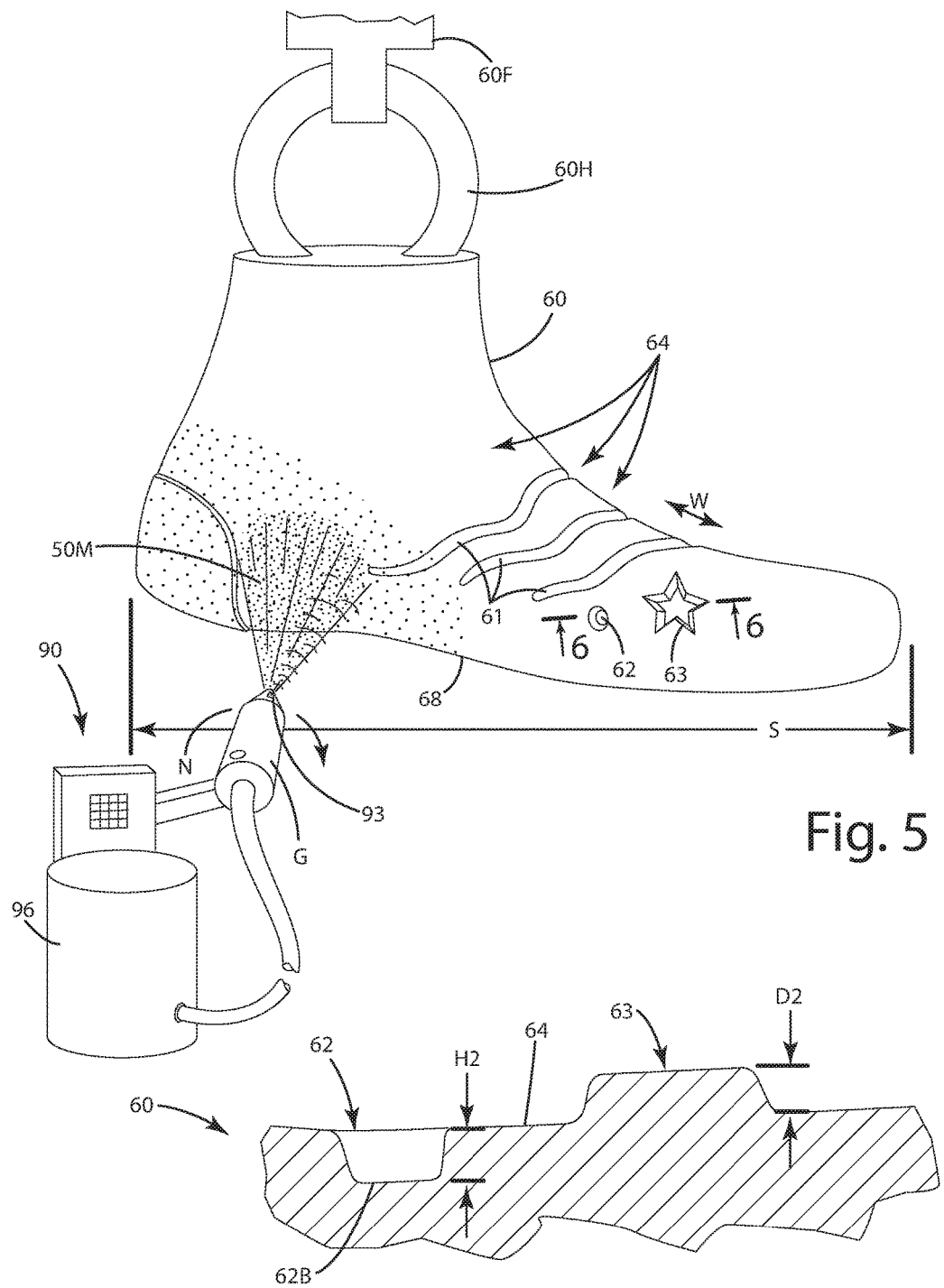
FIG. 5 is a side view of a last with a spray robot spraying thereon a spray-on fabric.
FIG. 6 is a section view of the last taken along lines 6-6 of FIG. 5.

With reference to FIG. 5, the last 60 optionally includes multiple exterior surfaces 64. These exterior surfaces 64 can include one or more aesthetic footwear designs 61, 62, 63 or others depending on the application and/or input from the user. These aesthetic footwear designs can be in the form of projections and/or recesses defined in the exterior surface 64 of the last 60. For example, as shown in FIG. 6, the recess 62 can be in a shallow hole having a bottom 62B that is spaced a depth H2 from the exterior surface 64 of the last 60. The last exterior 64 also can include a projection, such as the aesthetic footwear design 63 that projects from it a distance D2 above the exterior surface 64 of the last. The depth H2 can correspond to the height H of the respective, corresponding second aesthetic design 32 in the upper 20 as shown in FIG. 1. The distance D2 can correspond to the depth D of the recessed aesthetic footwear design 33 in the upper 20. Generally, the exterior surfaces of the last 60 are formed and configured to produce corresponding mirrored features on the interior of the upper facing the last.

Optionally, before step 102 of applying a spray-on fabric to the last exterior surfaces 64, a release coating can be brushed, rolled, or sprayed on those surfaces to facilitate removal of the fabric upper after it is produced. Alternatively, they last can be constructed from a polymer that has low adhesion properties so that the spray-on fabric upper easily releases from the last without any additional coatings.

Turning to the step 102 of applying the spray-on fabric, this is generally illustrated in FIG. 5. As mentioned above, the spray-on fabric composition can be sprayed on manually, for example, from an aerosol type pressurized can, or automatically via an automated machine, such as a spray robot 90. The spray robot 90 can include a source 96 of spray-on material, optionally pressurized for dispensing through the nozzle N. The spray robot 90 can move a gun G having the nozzle N over the exterior surfaces, maintaining the tip of the nozzle N a preselected distance from those exterior surfaces. This preselected distance can range from optionally 1 to 24 inches, further optionally 2 to 6 inches and further optionally about 8 inches or other distances depending on composition. The spray robot also can move the nozzle during the application step relative to the last in a pattern stored in a controller of the spray robot 90. This can maintain consistent application of the spray-on fabric material SOM, which again can be propelled in a liquid and/or semi liquid form when it is sprayed. Of course, in certain applications, the fabric upper can be thicker in some regions than in others. In this case, the nozzle can be moved by the spray robot 90 to produce this effect.

Optionally, the spray robot 90 can be outfitted with a sensor 93 that measures the distance between the tip of the nozzle and the exterior surfaces of the last 60. The sensor can be a proximity sensor, a laser operated sensor, an ultrasonic sensor and the like. The measurements of the sensor can be used to precisely move the nozzle for correct application of the spray-on material SOM. The sensor 93 can be configured to measure the thickness of the spray-on material as it is sprayed onto the last 60. In this manner, the spray robot 90 can precisely apply one or more thicknesses of the material to the exterior surface of the last, or in specific regions associated with the exterior surface. In some cases, the spray robot can apply the material, or extra layers of the material, only to preselected regions of last, perhaps for extra structural support in those regions. As an example, the spray robot 90 can apply extra material in the toe to produce a toe bumper and/or in the heel to provide extra stability in the heel region of the upper.

Although not shown, as mentioned above, the spray-on material can be applied manually. In this case, a user can utilize a pressurized aerosol can filled with the spray-on material. The user can then spray that material on the last in a controlled manner. While this manual application can sometimes be imprecise, it can provide high levels of customization for the user.

Optionally, the spray robot 90 can be configured to apply another coating to the exterior surfaces of the last and/or over previous layers of sprayed on material. For example the spray-on robot can be configured to apply another coating, optionally in the form of a second spray-on fabric, having physical properties that are different from the first spray-on fabric already applied to the last. For example, the coating can have a different color, texture, scent, reflectivity, elasticity, tensile stress, etc. relative to the first spray-on fabric. This coating can provide additional structural integrity and physical structure to the upper. In general, the coating can be another different spray-on fabric as mentioned above, or it can be other materials, such as rubber, plastic, thermoplastic polymers, paint or other liquids that can be sprayed onto the first spray-on fabric and/or last.

Further optionally, before, during or after the application step 102, structural components can be added to the upper. For example, a polymeric layer can be sprayed in certain regions of the fabric upper and/or on the last. As another example, and already formed strip of flexible plastic and/or woven material can be disposed on a the exterior surface 64 of the last 60, and/or the first exterior surface 21' of the spray-on upper before the fabric upper is turned inside out. This can provide a structural component to add structural stability and rigidity to the fabric upper in preselected regions. As yet another example, the strip of flexible plastic and/or woven material can be embedded within the spray-on fabric by spraying a first portion of the fabric on the last, covering that first portion with a strip, and then spraying another second portion of spray-on material over the strip and adjacent, previously sprayed on fabric.

As noted above, as the material is sprayed on by the spray-on robot 90 or manually, that material takes on the contours, shapes and dimensions of the exterior surfaces 64 of the last 60. Where there are aesthetic footwear designs included in the last, for example aesthetic footwear designs 61, 62 and 63, the spray-on material fills in and or covers portions of those aesthetic footwear designs. The spray-on material also builds up in thickness, particularly as successive layers of the spray-on material are applied over one another and/or the last. Optionally, the bottom surface 68 of the last 60 also can be covered by the spray-on material SOM. In this case, the resultant upper 20 includes a closed upper bottom that extends upward to the sides, front and back of the footwear 10. These components cooperatively form the interior foot cavity 21 of the finished footwear 10.

As shown in FIG. 2, the spray-on fabric can cure to form a non-woven fabric upper 20. This is further understood with reference to FIGS. 7-9. As shown there, the fabric upper 20 cures so that the first upper interior 24' is adjacent the exterior surfaces 64 of the three dimensional last 60. The upper 20 is of a thickness T1 which extends from the first upper interior 24' to the first upper exterior second upper interior 21'. The aesthetic footwear designs 62 and 63 of the last 60, as well as the other exterior surfaces 64 of the last form respective aesthetic footwear designs 32' and 33', which themselves are translated into the aesthetic footwear features 32 and 33 respectively, when the upper 20 is turned inside out.

As the spray-on material cures, carriers and/or solvents within the spray-on material can begin to evaporate and/or otherwise leave the remaining fabric material. The spray-on material can be allowed to cure for optionally 48 hours, further optionally 24 hours, even further optionally 10 hours, yet further optionally 4 hours, even further optionally 1 hour, and yet further optionally 15 minutes, depending on the drying properties, application and the thickness of the spray-on material. Generally, the spray-on material is allowed to cure for a sufficient amount of time so that when the nonwoven fabric upper 20 is removed from the last in step 104, the upper does not tear, become damaged, or otherwise fall apart.

Figure 7:
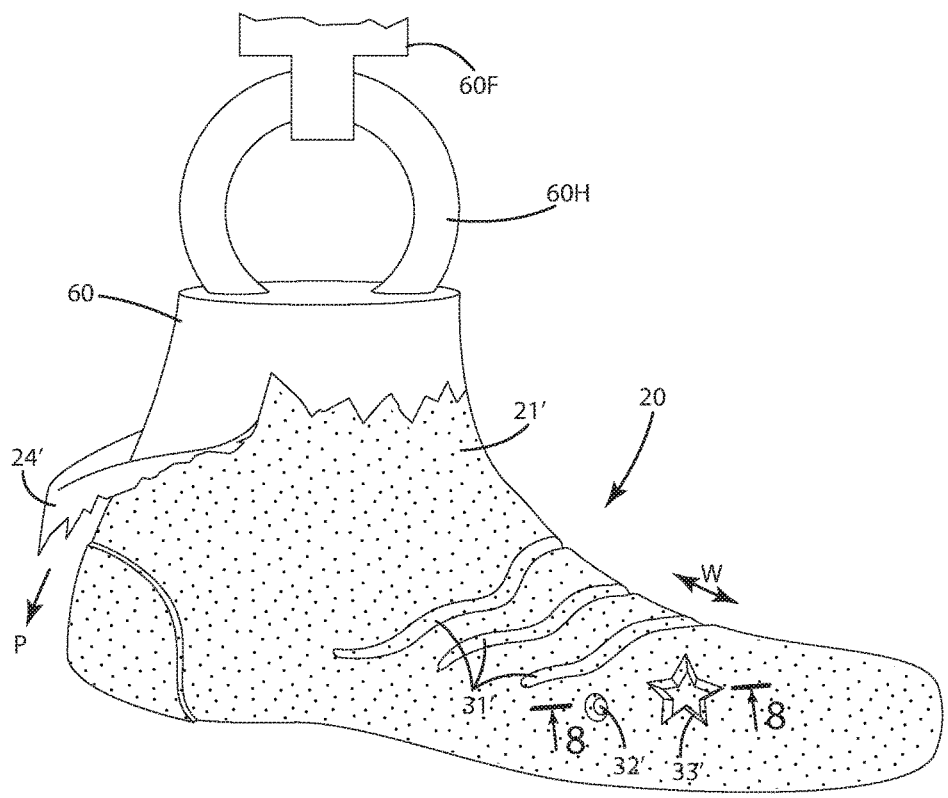
FIG. 7 is a side view of the last with the upper being pulled from the last and turned inside out.
Figure 8:
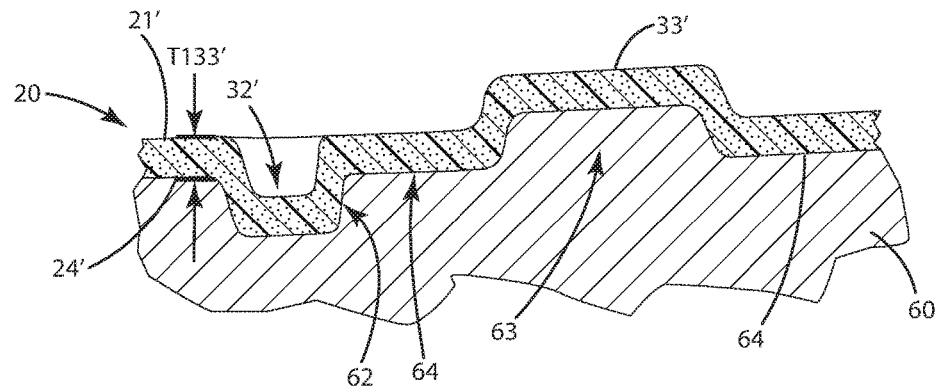
FIG. 8 is a section view of the upper on the last taken along lines 8-8 of FIG. 7.

As the upper 20 is removed from the last, shown in FIG. 7, the upper can be turned inside out. For example the first upper exterior 21' becomes the second upper exterior 21, and the first upper interior 24' becomes the second upper exterior 24. When the upper is turned inside out, those aesthetic footwear designs that were formed by aesthetic footwear design 62 in the form of a recess, for example 32', are turned inside out to become projections, for example projection 32. Likewise, the aesthetic footwear designs that were formed by aesthetic footwear design 63 in the form of a projection, for example 33', are turned inside out to become recesses, for example recess 33.

Optionally, upon turning the upper inside out mirror images of the respective projections and recesses are formed on the second upper exterior. Further optionally, an upper that was formed on the last having a configuration similar to a right footed three dimensional last, is effectively reconfigured to a left footed three-dimensional last. In other words, optionally, the upper formed on a right footed three-dimensional last can become the upper for the finished left shoe; and the upper formed on a left footed last can become the upper for the finished right shoe.

Figure 9:
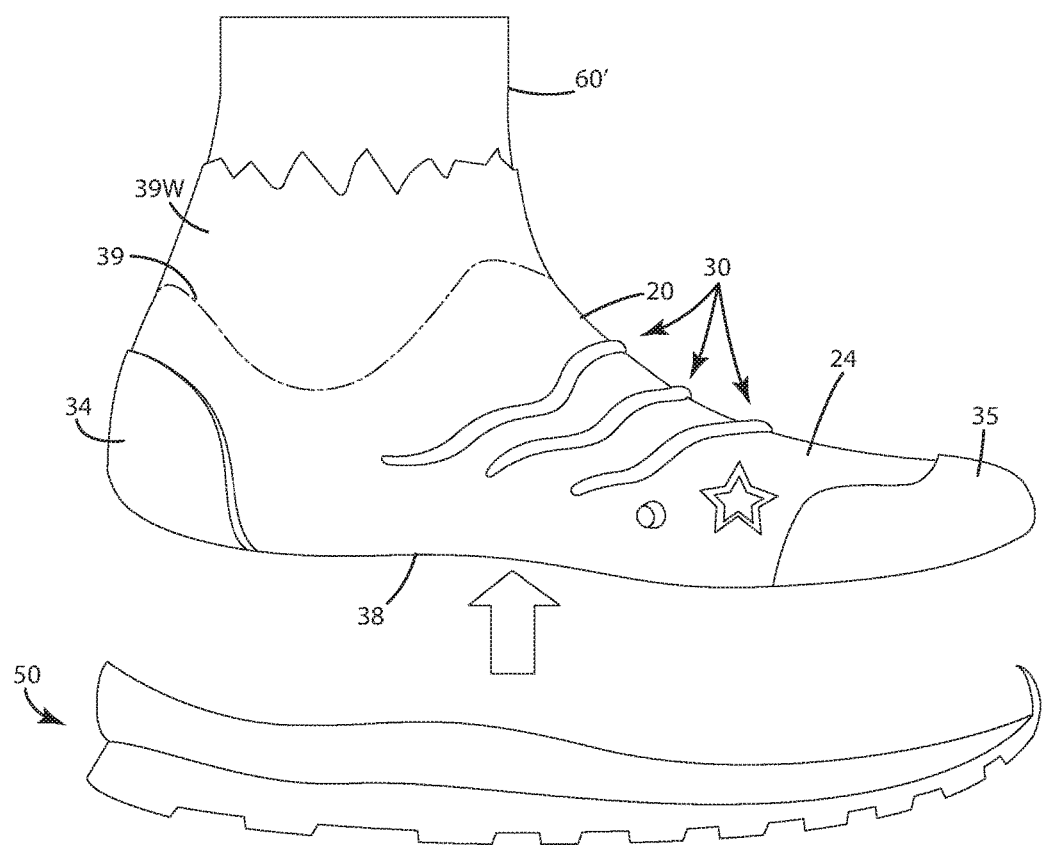
FIG. 9 is a side view of a sole being joined with a closed bottom of the sprayed on nonwoven fabric upper.

In step 105, the bottom of the fabric upper 38, as shown in FIG. 9, can be joined with a sole 50. To do so, the upper, still being turned inside out (or now, right side out), can be placed on a second last 60', or optionally the same original three dimensional last 60, so that the upper is stretched out in a configuration sufficient to apply the sole 50. Optionally, when the upper 20 is disposed on the last 60' as shown in FIG. 9, the coatings mentioned above can be added to the exterior surfaces 24 of that upper. The joining of the sole 50 and the upper 20 can be accomplished using adhesives, cement, injection molding, pour molding, dipping, coating, or covering of the upper in or with a sole material, or any other technique used to join an upper and sole. Thereafter, the sole 50 is fixedly joined to the bottom of the non-woven flexible fabric upper 20.

Optionally, the upper 20 can be trimmed. For example, waste material 39W can be trimmed along trim line 39 and removed from the remainder of the upper. The upper can be pulled off the last 60'. The upper also can be reinforced in high stress areas. For example, near the toe bumper 35 and/or heal counter 34, a coating, stitching or glued on structural overlays can be joined to second upper exterior 24 after turning, or before depending on application. Sealants, UV inhibitors, waterproofing materials and the like can be added to the upper. Thereafter, the finished footwear, including the nonwoven fabric upper and sole, can be packaged and/or distributed, depending on the application.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z, in any number of units within those combinations.

The embodiments of the invention in which an exclusive property or privilege is claimed are defined as follows:

1. A method of constructing footwear comprising:
   providing three dimensional last data corresponding to at least one of an aesthetic footwear design, a dimension of a sample foot and a surface contour of the sample foot;
   printing a three dimensional last utilizing the three dimensional last data, the three dimensional last including a plurality of exterior footwear surfaces;
   providing a source of spray-on fabric, the spray-on fabric comprising a plurality of fibers that are combined with a polymer and a solvent, the solvent adapted to enable the spray-on fabric to be dispensed from the source in at least one of a liquid form and a semi-liquid form;
   spraying the spray-on fabric onto the plurality of exterior footwear surfaces of the three dimensional last;
   allowing the spray-on fabric to cure on the three dimensional last to form a flexible non-woven first fabric upper, the first fabric upper having a thickness extending from a first upper exterior to a first upper interior, the first upper interior being adjacent the three dimensional last;
   removing the first fabric upper from the three dimensional last;

turning the first fabric upper inside out so that the first upper exterior becomes a second upper interior, and the first upper interior becomes a second upper exterior, the second upper exterior having an upper bottom; and joining a sole to the upper bottom, whereby a finished footwear is produced corresponding to at least one of the sample foot and aesthetic footwear design.

2. The method of claim 1,
wherein the plurality of exterior footwear surfaces includes the aesthetic footwear design expressed in a three dimensional form,
wherein during the spraying step, the spray-on fabric covers the three dimensional form,
wherein the three dimensional form is reflected on the first upper interior.

3. The method of claim 2,
wherein after the turning step, the three dimensional form is visible and exposed on the second upper exterior.

4. The method of claim 1, comprising:
selecting the aesthetic footwear design; and
associating the aesthetic footwear design with the three dimensional last data.

5. The method of claim 4, comprising:
providing an interface so that a consumer performs the selecting step via an interface.

6. The method of claim 1,
wherein the plurality of exterior footwear surfaces include a first plurality of recesses and a first plurality of projections;
wherein during the spraying step, the spray-on fabric extends into the first plurality of recesses and over the first plurality of projections,
wherein after the turning step, the second upper exterior includes a second plurality of projections that correspond to the first plurality of recesses, and a second plurality of projections that correspond to the first plurality of recesses.

7. The method of claim 1, comprising at least one of 3D printing the sole on the upper bottom, adhering the sole to the upper bottom and molding the sole to the upper bottom.

8. The method of claim 1 comprising spraying the spray-on fabric onto the plurality of exterior footwear surfaces with an automated machine.

9. The method of claim 1 comprising spraying the spray-on fabric onto the plurality of exterior footwear surfaces with a nozzle guided manually by a human.

10. A method of constructing footwear comprising:
spraying a first spray-on fabric onto a plurality of exterior footwear surfaces of a three dimensional last, the three dimensional footwear being in the form of a human foot;
allowing the first spray-on fabric to cure on the three dimensional last to form a flexible non-woven first fabric upper, the first fabric upper having a thickness extending from a first upper exterior to a first upper interior, the first upper interior being adjacent the three dimensional last;
removing the first fabric upper from the three dimensional last;
turning the first fabric upper inside out so that the first upper exterior becomes a second upper interior, and the first upper interior becomes a second upper exterior; and joining a sole to the first fabric upper while the first fabric upper is turned inside out, whereby a finished footwear is produced corresponding to at least one of the sample foot and aesthetic footwear design.

11. The method of claim 10 comprising:
providing a consumer interface so that the consumer can input an aesthetic footwear design to a controller;
controlling a three dimensional printer with the controller utilizing the aesthetic footwear design; and
printing the three dimensional last with the three dimensional printer before the spraying step.

12. The method of claim 11 comprising:
inputting three dimensional last data to an additive manufacturing machine, the three dimensional last data corresponding to at least one of an aesthetic footwear design, a dimension of a sample foot and a surface contour of the sample foot;
producing the three dimensional last with the additive manufacturing machine by depositing a plurality of successive levels of polymeric material on a surface.

13. The method of claim 10 comprising:
applying a coating layer to preselected regions of the second upper exterior after the turning step.

14. The method of claim 13,
wherein the coating layer comprises a polymer that adds structural stability and rigidity to the first fabric upper in the preselected regions.

15. The method of claim 13 comprising:
applying a coating layer to preselected regions of the first upper exterior, wherein the coating layer comprises a second spray-on fabric having at a different property than the first spray-on fabric.

16. The method of claim 15 comprising joining a structural overlay to the second upper exterior after the turning step.

17. The method of claim 10, comprising spraying the spray-on fabric through a nozzle that is moved relative to the last via an automated machine.

18. The method of claim 17,
wherein the spray-on fabric comprises a plurality of fibers, a polymer and a solvent,
wherein the solvent is adapted to enable the spray-on fabric to be dispensed from the nozzle in at least one of a liquid form and a semi-liquid form.

19. The method of claim 18 comprising:
allowing the solvent to evaporate before the removing step.

20. A method of constructing footwear comprising:
spraying a spray-on fabric onto a plurality of exterior footwear surfaces of a first three dimensional last in the form of a human foot;
allowing the spray-on fabric to cure to form a flexible non-woven fabric upper;
removing the fabric upper from the first three dimensional last;
turning the fabric upper inside out;
placing the fabric upper on a second three dimensional last while the fabric upper is turned inside out; and
joining a sole to the fabric upper while the fabric upper is turned inside out and disposed on the second three dimensional last.

* * * * *